United States Patent
Lindoff et al.

(10) Patent No.: US 10,785,712 B2
(45) Date of Patent: Sep. 22, 2020

(54) RAT SELECTION IN DUAL MODE TRANSCEIVERS

(71) Applicant: Telefonaktiebolaget LM Ericsson (publ), Stockholm (SE)

(72) Inventors: Bengt Lindoff, Bjärred (SE); Joakim Axmon, Limhamn (SE); Muhammad Kazmi, Sundbyberg (SE); Santhan Thangarasa, Vällingby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/749,323

(22) Filed: Jan. 22, 2020

(65) Prior Publication Data
US 2020/0163006 A1 May 21, 2020

Related U.S. Application Data

(62) Division of application No. 15/159,891, filed on May 20, 2016, now Pat. No. 10,588,072.

(51) Int. Cl.
*H04W 48/16* (2009.01)
*H04W 48/18* (2009.01)
(Continued)

(52) U.S. Cl.
CPC ....... *H04W 48/16* (2013.01); *H04W 36/0066* (2013.01); *H04W 48/18* (2013.01);
(Continued)

(58) Field of Classification Search
CPC .................................................. H04W 48/16
See application file for complete search history.

(56) References Cited

U.S. PATENT DOCUMENTS

| 9,408,119 | B2 * | 8/2016 | Kunugi | ............. | H04W 36/0066 |
| 2003/0190894 | A1 * | 10/2003 | Jabbary | ................ | H04B 17/318 |
| | | | | | 455/69 |

(Continued)

FOREIGN PATENT DOCUMENTS

| WO | 2013104565 A1 | 7/2013 |
| WO | 2014109684 A1 | 7/2014 |
| WO | 2015096916 A1 | 7/2015 |

OTHER PUBLICATIONS

Sony, "Coexistence of eMTC and NB-IoT," 3GPP TSG RAN WG1 Meeting #83, Agenda Item: 6.2.1.2, Anaheim, USA, Nov. 15, 2015, pp. 1-4, R1-156693, 3GPP.

(Continued)

*Primary Examiner* — Hsinchun Liao
(74) *Attorney, Agent, or Firm* — Coats & Bennett, PLLC

(57) ABSTRACT

The wireless apparatus and network node disclosed herein facilitate the selection and use of one of multiple RATs for communications between the wireless apparatus and the network node. The selected RAT provides a lower energy consumption at the wireless apparatus for the communications with the network node. To that end, the wireless apparatus selects between at least two RATs, e.g., first and second RATs, where the first and second RATs are both coordinated by a network node in communication with the wireless apparatus, and where a system bandwidth of the second RAT and a system bandwidth of the first RAT are both comprised within a third system bandwidth of a third RAT coordinated by the network node.

7 Claims, 7 Drawing Sheets

(51) Int. Cl.
*H04W 88/06* (2009.01)
*H04W 76/27* (2018.01)
*H04W 36/00* (2009.01)
*H04W 52/02* (2009.01)
*H04W 28/02* (2009.01)
*H04W 48/12* (2009.01)

(52) U.S. Cl.
CPC ........... *H04W 76/27* (2018.02); *H04W 88/06* (2013.01); *H04W 28/0221* (2013.01); *H04W 48/12* (2013.01); *H04W 52/0229* (2013.01); *Y02D 30/70* (2020.08)

(56) References Cited

U.S. PATENT DOCUMENTS

| | | |
|---|---|---|
| 2005/0261037 A1 | 11/2005 | Raghunath et al. |
| 2009/0068969 A1 | 3/2009 | Lindoff et al. |
| 2010/0075665 A1 | 3/2010 | Nader et al. |
| 2012/0250644 A1* | 10/2012 | Sambhwani ...... H04W 72/0413 370/329 |
| 2013/0260757 A1 | 10/2013 | Deivasigamani et al. |
| 2016/0066234 A1 | 3/2016 | Cho et al. |

OTHER PUBLICATIONS

Ericsson, "Support of NB-IoT and eMTC in the same cell," 3GPP TSG RAN WG1 Meeting #84, Agenda Item: 7.1.5, St. Julian's, Malta, Feb. 15, 2016, pp. 1-4, R1-160257, 3GPP.

* cited by examiner

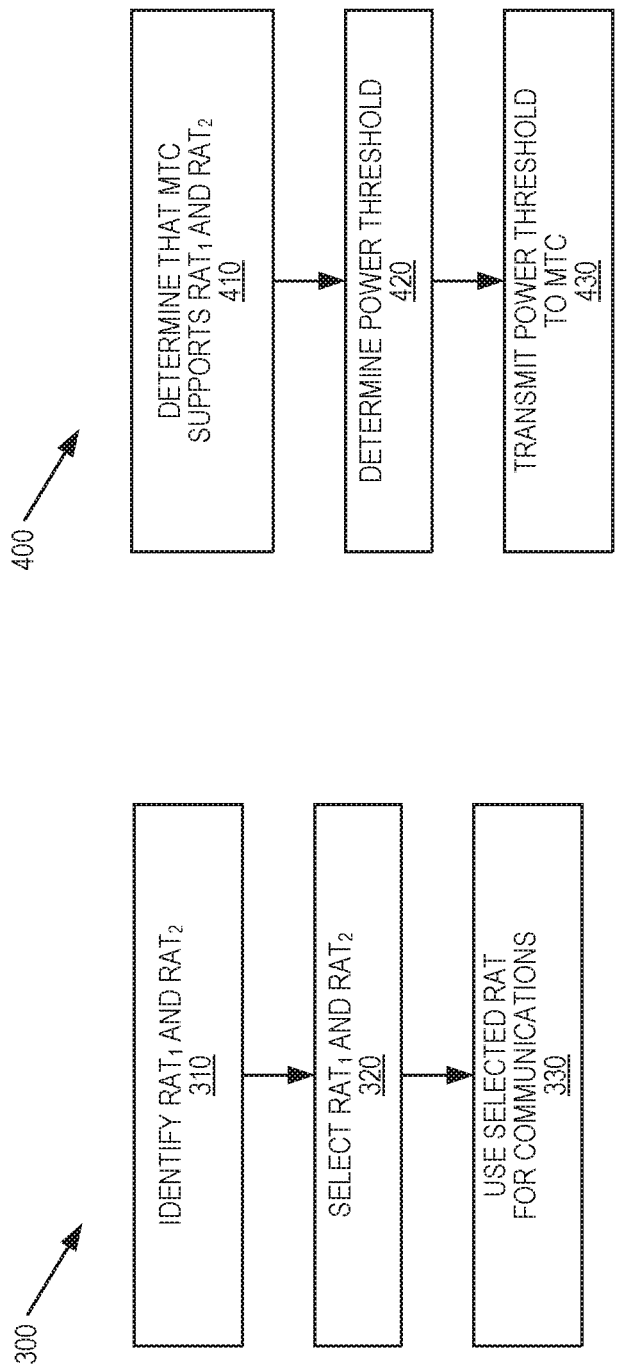

RAT SELECTION IN DUAL MODE TRANSCEIVERS

RELATED APPLICATIONS

This application is a Divisional of prior U.S. application Ser. No. 15/159,891, filed 20 May 2016, the entire disclosure of which being hereby incorporated by reference herein.

BACKGROUND

Machine-to-Machine (M2M) communication, also known as Machine-Type Communication (MTC) or Internet of Things (IoT) communication, enables the establishment of communications between two or more machines or devices, as well as between machines or devices and humans. Such communications include, but are not limited to, the exchange of data (including measurement data), signaling, configuration information, etc. The machines involved in such communications may vary in size, and are typically used for a wide variety of applications, e.g., sensing environmental conditions (e.g., temperature reading), taking meter measurements (e.g., electricity usage), finding faults and/or errors (e.g., bridge fault detection), etc. In many applications, the machines involved in this type of communication are active infrequently but over a consecutive duration, e.g., approximately 200 ms every 2 seconds, approximately 500 ms every 60 minutes, etc. As such, these machines typically have low/intermittent power consumption, and many therefore be powered by a single AA battery for years, e.g., up to 10 years.

Given that these machines are often battery powered, minimizing the power consumption is of utmost importance. Because the power requirements of a single one of these devices depends heavily on the current wireless environment and the amount of data that needs to be transmitted, which is often variable, it is challenging to pre-configure a single device such that the lowest possible power consumption is achievable for all scenarios. Thus, there remains a need for improved solutions associated with M2M communications.

SUMMARY

The solution presented herein enables a wireless apparatus in communication with a network node to select the Radio Access Technology (RAT) for communications between the wireless apparatus and the network node that results in a lower energy consumption at the wireless apparatus.

One exemplary embodiment provides a method of selecting a RAT as implemented by a multi-mode wireless apparatus configured to communicate with a network node using the selected RAT. The method comprises identifying a first RAT and a second RAT that are both coordinated by the network node. A second system bandwidth of the second RAT and a first system bandwidth of the first RAT are both comprised within a third system bandwidth of a third RAT coordinated by the network node. The method further comprises selecting the one of the first RAT and the second RAT that results in a lower energy consumption at the wireless apparatus for communications between the wireless apparatus and the network node. The method further comprises using the selected RAT for communications between the wireless apparatus and the network node.

One exemplary embodiment provides a multi-mode wireless apparatus configured to select a RAT for communications with a network node. The wireless apparatus comprises a RAT identification and selection circuit and a communication circuit. The RAT identification and selection circuit is configured to identify a first RAT and a second RAT that are both coordinated by the network node. A second system bandwidth of the second RAT and a first system bandwidth of the first RAT are both comprised within a third system bandwidth of a third RAT coordinated by the network node. The RAT identification and selection circuit is further configured to select the one of the first RAT and the second RAT that results in a lower energy consumption at the wireless apparatus for communications between the wireless apparatus and the network node. The communication circuit is configured to use the selected RAT for communications between the wireless apparatus and the network node.

One exemplary embodiment provides a method of selecting a RAT as implemented by a network node configured to communicate with a multi-mode wireless apparatus using the selected RAT. The method comprises determining that the wireless apparatus supports communications with the network node using a first RAT and a second RAT that are both coordinated by the network node. A second system bandwidth of the second RAT and a first system bandwidth of the first RAT are both comprised within a third system bandwidth of a third RAT coordinated by the network node. The method further comprises determining at least one power threshold associated with an amount of transmit power required for the wireless apparatus for communications between the wireless apparatus and the network node. The at least one power threshold controls the selection of the first RAT or the second RAT for the communications between the wireless apparatus and the network node. The method further comprises transmitting the at least one power threshold to the wireless apparatus.

One exemplary embodiment provides a network node configured to communicate with a multi-mode wireless apparatus using a RAT selected by the wireless apparatus. The network node comprises a RAT circuit and a communication circuit. The RAT circuit is configured to determine that the wireless apparatus supports communications with the network node using a first RAT and a second RAT that are both coordinated by the network node. A second system bandwidth of the second RAT and a first system bandwidth of the first RAT are both comprised within a third system bandwidth of a third RAT coordinated by the network node. The RAT circuit is further configured to determine at least one power threshold associated with an amount of transmit power required for the wireless apparatus for communications between the wireless apparatus and the network node. The at least one channel threshold controls the selection of the first RAT or the second RAT for the communications between the wireless apparatus and the network node. The communication circuit is configured to transmit the at least one power threshold to the wireless apparatus.

One exemplary embodiment provides a computer program product stored in a non-transitory computer readable medium for controlling a processing circuit in a multi-mode wireless apparatus in communication with a network node. The computer program product comprises software instructions which, when run on the processing circuit, causes the processing circuit to identify a first RAT and a second RAT that are both coordinated by the network node. A second system bandwidth of the second RAT and a first system bandwidth of the first RAT are both comprised within a third system bandwidth of a third RAT coordinated by the network node. The computer program product comprises software instructions which, when run on the processing circuit, further causes the processing circuit to select the one of the first RAT and the second RAT that results in a lower energy consumption at the wireless apparatus for communications between the wireless apparatus and the network node. The computer program product comprises software instructions which, when run on the processing circuit, causes the processing circuit to use the selected RAT for communications between the wireless apparatus and the network node.

One exemplary embodiment provides a computer program product stored in a non-transitory computer readable medium for controlling a processing circuit in a network node (100) in communication with a multi-mode wireless apparatus. The computer program product comprises software instructions which, when run on the processing circuit, causes the processing circuit to determine that the wireless apparatus supports communications with the network node using a first RAT and a second RAT that are both coordinated by the network node. A second system bandwidth of the second RAT and a first system bandwidth of the first RAT are both comprised within a third system bandwidth of a third RAT coordinated by the network node. The computer program product comprises software instructions which, when run on the processing circuit, causes the processing circuit to determine at least one power threshold associated with an amount of transmit power required for the wireless apparatus for communications between the wireless apparatus and the network node. The at least one power threshold controls the selection of the first RAT or the second RAT for the communications between the wireless apparatus and the network nod. The computer program product comprises software instructions which, when run on the processing circuit, causes the processing circuit to transmit the at least one power threshold to the wireless apparatus.

One exemplary embodiment provides a multi-mode wireless apparatus configured to select a RAT for communications with a network node. The wireless apparatus comprises a RAT identification module, a selection module, and a communication module. The RAT identification module is configured to identify a first RAT and a second RAT that are both coordinated by the network node. A second system bandwidth of the second RAT and a first system bandwidth of the first RAT are both comprised within a third system bandwidth of a third RAT coordinated by the network node. The selection module is configured to select the one of the first RAT and the second RAT that results in a lower energy consumption at the wireless apparatus for communications between the wireless apparatus and the network node. The communication module is configured to use the selected RAT for communications between the wireless apparatus and the network node.

One exemplary embodiment provides a network node configured to communicate with a multi-mode wireless apparatus using a RAT selected by the wireless apparatus. The network node comprises a RAT module, a threshold module, and a communication module. The RAT module is configured to determine that the wireless apparatus supports communications with the network node using a first RAT and a second RAT that are both coordinated by the network node. A second system bandwidth of the second RAT and a first system bandwidth of the first RAT are both comprised within a third system bandwidth of a third RAT coordinated by the network node. The threshold module is configured to determine at least one power threshold associated with an amount of transmit power required for the wireless apparatus for communications between the wireless apparatus and the network node. The at least one channel threshold controls the selection of the first RAT or the second RAT for the communications between the wireless apparatus and the network node. The communication module is configured to transmit the at least one power threshold to the wireless apparatus.

BRIEF DESCRIPTION OF THE DRAWINGS

FIG. 2A shows a wireless network according to one exemplary embodiment, while

FIG. 3 shows a RAT selection method implemented by the wireless apparatus according to one exemplary embodiment.

FIG. 6 shows a method implemented by the network node according to one exemplary embodiment.

DETAILED DESCRIPTION

Figure 1:
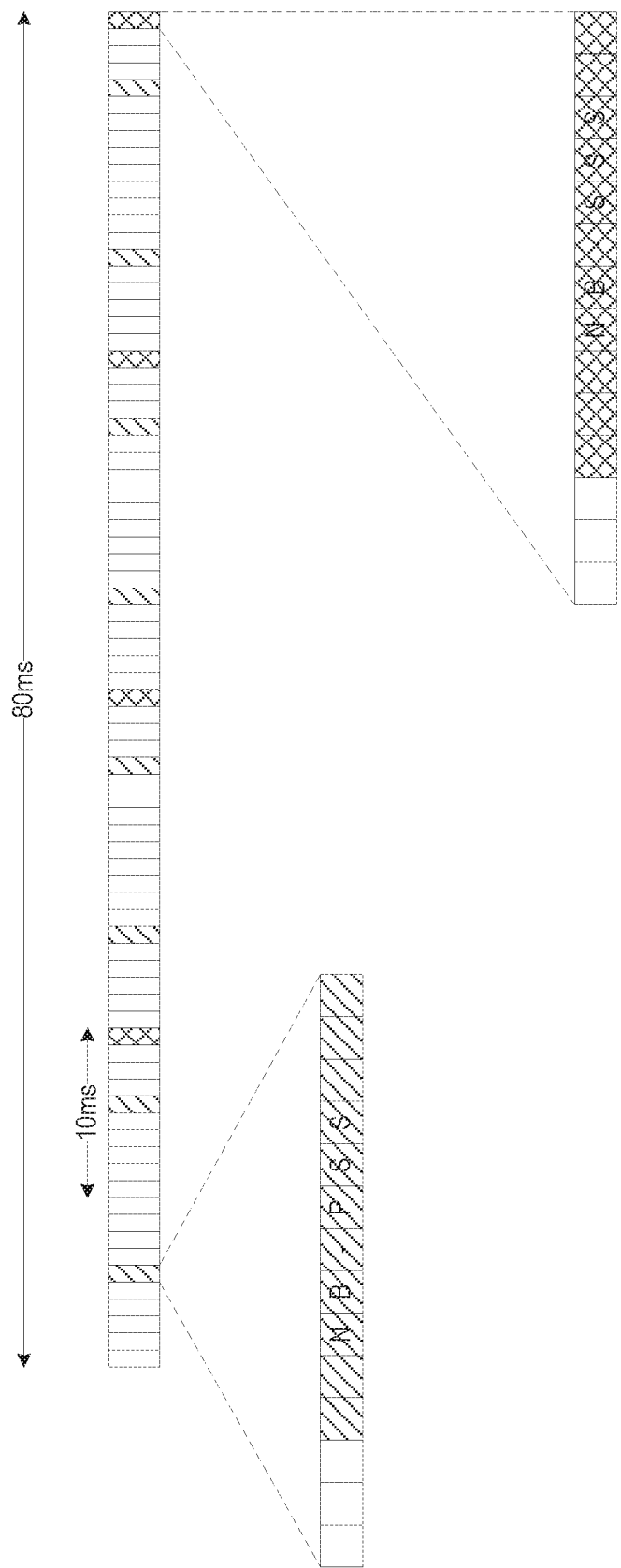
FIG. 1 shows exemplary resource mapping for NB-PSS and NB-SSS for NB-IoT.

The solution presented herein enables a wireless apparatus in communication with a network node to select and use the Radio Access Technology (RAT) that provides a lower energy consumption at the wireless apparatus for communications with the network node than would otherwise be provided with another RAT. To that end, the wireless apparatus selects between at least two RATs, e.g., first and second RATs, where the first and second RATs are both coordinated by a network node in communication with the wireless apparatus, and where a system bandwidth of the second RAT and a system bandwidth of the first RAT are both comprised within a system bandwidth of a third RAT coordinated by the network node. As used herein, multiple RATs all being coordinated by the same network node refers to the handling of all of the multiple RATs by a single network node. The solution presented herein is described in terms of a wireless apparatus that comprises a Machine-Type Communication (MTC) apparatus. It will be appreciated, however, that the solution presented herein may be used for any wireless apparatus that sends signals to the network node via uplink communications and that receives signals from the network node via downlink communications. Exemplary wireless apparatus include, but are not limited to, MTC apparatus, Device-to-Device (D2D) apparatus, Machine-to-Machine (M2M) apparatus, Internet of Things (IoT) devices, User Equipment (UE), mobile telephones, sensors, tablets, personal computers, set-top boxes, cameras, etc. Further, the network node may comprise any wireless access node that transmits signals to the wireless apparatus via downlink communications and receives signals from the wireless apparatus via uplink communications. Exemplary network nodes include, but are not limited to, a base station, access point, NodeB, eNodeB, etc. Before providing the details of this solution, however, the following first provides additional information about M2M of MTC communications, and the challenges associated with such communications.

There are many aspects of MTC to keep in mind when designing an MTC apparatus, the associated network node, and/or the standards involved with MTC, e.g., path loss/the need for coverage enhancement, the type of access network (s) available and the pros/cons of each access network, the types of processes that need to be implemented by the MTC apparatus, channel re-selection, etc. For example, in some scenarios, the path loss between the MTC apparatus and the network node can be very large, e.g., when the MTC apparatus is a sensor or metering device located far from the network node and/or in a location where there are many obstacles between the MTC apparatus and the network node, e.g., a basement. The coverage level of the MTC apparatus with respect to a cell may be expressed in terms of signal level, e.g., signal quality, signal strength, or path loss with respect to that cell. For example, the coverage level of the MTC apparatus may be represented as a path loss that is 20 dB worse than would be under normal operation, e.g., as compared to LTE devices associated with any release before the 3GPP Release 12 standard. In such scenarios, it is challenging for the MTC apparatus to receive a signal from the network node. In order to cope with such challenges, coverage enhancement may be provided for the uplink (UL) and/or downlink (DL), where the coverage enhancement substantially enhances the coverage with respect to the normal coverage (e.g., legacy coverage). Coverage enhancement may be realized, e.g., by employing one or a plurality of advanced techniques in the MTC apparatus and/or in the network node for enhancing the coverage. Some non-limiting examples of such advanced techniques include, (but are not limited to, transmit power boosting, repetition of transmitted signal, applying additional redundancy to the transmitted signal, use of advanced/enhanced receiver, usage of more robust modulation, etc. In general when employing coverage enhancement techniques, the MTC apparatus operates in a "coverage enhancement" or a "coverage extending" mode. 3GPP Release 13 for LTE introduces a user equipment (UE) MTC capability referred to as evolved MTC (eMTC), or Category M1 (Cat-M1). Cat-M1 or eMTC devices or UEs are able to operate anywhere within an LTE carrier with up to its 20 MHz system bandwidth, but each Cat-M1 UE will operate with a maximum bandwidth limited to 1.4 MHz. Hence, eMTC only supports a 1.4 MHz bandwidth (e.g., six resource blocks (RBs)), even though the total system bandwidth of the LTE cell is typically larger than 1.4 MHz (e.g., 10, 15, or 20 MHz). The eMTC reuses all primary synchronization signals (PSSs)/secondary synchronization signals (SSSs) and cell-specific reference signals (CRSs) defined for ordinary LTE with the exception that the eMTC can only measure the CRS within the 1.4 MHz bandwidth. However, because all radio resource management (RRM) measurement and cell search requirements for LTE are defined for 1.4 MHz, and hence also for legacy LTE UE, which uses such wide signals for RRM measurements, all legacy RRM measurements can be reused. Hence, an eMTC device executes a regular LTE cell search, detects PSS/SSS, and then reads the standard Master Information Block (6 RB wide), but then searches for a specific System Information Block (SIB 1 bis) that then points out the specific eMTC 6 RB wide allocation within the entire LTE system bandwidth. Due to the 1.4 MHz system bandwidth restriction for eMTC, the standard LTE physical downlink control channel (PDCCH) could not be read by an eMTC capable device, and hence the eMTC needs to rely on a specific Machine type Physical Downlink Control Channel (M-PDCCH) that is one RB wide and points out the Physical Downlink Shared Control Channel (PDSCH) the device is scheduled on, e.g., maximum 6 RBs wide. In the description herein, we define the eMTC as a specific RAT that is allocated/comprised within the standard LTE system bandwidth. 3GPP Release 13 for LTE further introduces a user equipment (UE) MTC capability referred to as the Narrow Band Internet of Things (NB-IoT), or Category M2 (Cat-M2), and provides a radio access solution that improves coverage for scenarios where there are many obstacles between the MTC apparatus and the network node, e.g., indoor scenarios. In the description presented herein, we define NB-IoT as a specific RAT that is allocated/comprised within the standard LTE system bandwidth. NB-IoT also supports large numbers of low throughput devices, addresses low delay sensitivity issues, supports ultra-low device cost, supports lower power consumption, and optimizes the network architecture in some cases. NB-IoT typically has a system bandwidth of 200 kHz, and operates in one of the following LTE system bandwidths: 1.4 MHz, 3 MHz, 10 MHz, 15 MHz, and 20 MHz. To provide the above-described benefits, NB-IoT supports three different modes of operation of a wireless apparatus:

1. "Stand-alone" operation utilizes, e.g., the spectrum currently being used by GERAN (GSM (Global System for Mobile communications) EDGE (Enhanced Data rates for GSM Evolution) Radio Access Network) systems as a replacement of one or more GSM carriers. In principle, stand-alone operation operates on any carrier frequency that is neither within the carrier of another system nor within the guard band of another system's operating carrier. The other system can be another NB-IoT system or technology or any other RAT, e.g., LTE (Long Term Evolution).
2. "Guard band" operation utilizes the unused resource blocks within an LTE carrier's guard-band. The term guard band may also interchangeably be referred to as guard bandwidth. As an example, in case of an LTE system bandwidth of 20 MHz (or 100 Radio Bearers (RBs)), the guard band operation of NB-IoT can place anywhere outside the central 18 MHz but within 20 MHz LTE bandwidth.
3. "In-band" operation utilizes resource blocks within a normal LTE carrier. The in-band operation may also interchangeably be called in-bandwidth operation. More generally, the operation of one RAT within the bandwidth of another RAT is also called in-band operation. As an example, in an LTE bandwidth of 50 RBs (i.e., a system bandwidth of 10 MHz), any NB-IoT operation over one resource block (RB) within the 50 RBs is referred to as in-band operation.

In NB-IoT systems or scenarios, DL transmissions are based on OFDM (Orthogonal Frequency Division Multiplexing) with 15 kHz subcarrier spacing and the same symbol and cyclic prefix durations as used for legacy LTE for all three scenarios: standalone, guard-band, and in-band. For UL transmissions, both single tone transmission and multi-tone transmissions based on SC-FDMA (Single Carrier Frequency Division Multiple Access) are supported. This means that the physical waveforms for NB-IoT in the DL, and also partly in the UL, is similar to legacy LTE.

In the DL systems, NB-IoT supports both master information broadcast and system information broadcast, which are carried by different physical channels. For in-band operation, it is possible for an NB-IoT MTC apparatus to decode the NB-PBCH (Physical Broadcast Channel) without knowing the legacy PRB (Physical Resource Block) index. NB-IoT supports both downlink physical control channels (e.g., NB-PDCCH (Physical Downlink Control Channel)) and downlink physical shared channels (e.g., PDSCH (Physical Downlink Shared Control Channel)). The operating mode of NB-IoT must be indicated to the MTC apparatus, and currently 3GPP ($3^{rd}$ Generation Partnership Project) provides the indication by means of NB-SSS (Secondary Synchronization Signal), NB-MIB (Master Information Block), or other downlink signals.

Similarly to legacy LTE, the DL synchronization signals in NB-IoT systems consist of an NB primary synchronization signal (NB-PSS) and an NB secondary synchronization signal (NB-SSS).

For NB-IoT, the DL subcarrier spacing and DL system bandwidth is 15 kHz and 200 kHz, respectively, with an "efficient" bandwidth of 180 kHz, which is equivalent to one Physical Resource Block (PRB) in a conventional LTE cell. Currently, two configurations for cyclic prefix are considered: normal and extended.

System information is provided via a master information block transmitted on the NB Physical Broadcast Channel (NB-PBCH), for which format and allocation are known a priori, and via system information block(s) that are transmitted on the NB Physical Downlink Shared Channel (NB-PDSCH). New synchronization signals NB-PSS and NB-SSS are introduced, with a single instance of NB-PSS and 504 instances of NB-SSS. The synchronization signals occupy a fixed number of OFDM symbols in each subframe that is carrying the synchronization signals. The synchronization signals are not occupying the first three OFDM symbols in the subframe, and for the scenario where NB-IoT is deployed in the bandwidth of a regular LTE cell, Cell-specific Reference Signals (CRSs) of that regular LTE cell will puncture the NB-PSS or NB-SSS if necessary. For a normal cyclic prefix, it is assumed that the NB-PSS and NB-SSS span 9 or 11 OFDM symbols (to be down-selected to one value), and that within the span, 6 to 11 OFDM symbols carry the synchronization information (to be down-selected to one value). For extended cyclic prefix, the corresponding designations are 9 OFDM symbols and 6 to 9 OFDM symbols, respectively. For the in-band scenario, NB-PSS and NB-SSS are boosted by up to 6 dB relative to the CRS power level in the regular LTE cell. The repetition rates of NB-PSS and NB-SSS might differ; 20 ms and 80 ms, respectively, has been proposed, as well as 10 ms and 20 ms, and 20 ms and 40 ms, respectively.

Similar to LTE, the synchronization signals for NB-IoT comprise a Primary Synchronization Signal (NB-PSS) and a Secondary Synchronization Signal (NB-SSS). The number of versions, the composition, and the periodicity, however, differs from the legacy LTE system. For NB-IoT, there is a single PSS common to all 504 cell identities, and there are 504 cell identities represented by SSS. In subframes that carry synchronization signals, the current proposal is for the NB-PSS to occupy the last 11 OFDM symbols and for the NB-SSS to occupy the last 9 or 11 symbols for the normal cyclic prefix configuration. It is specified that eleven sub-carriers are used for NB-PSS, and that twelve subcarriers are used for NB-SSS. The periodicities for NB-PSS and NB-SSS are 10 ms and 20 ms, respectively. FIG. 1 shows an exemplary resource element mapping of NB-PSS and NB-SSS for NB-IoT.

Regarding UL, two solutions for UL transmissions are supported in NB-IoT: single-tone transmissions using either of two possible configurations, e.g., a 3.75 kHz configuration and a 15 kHz configuration, and multi-tone transmissions using a 15 kHz subcarrier spacing in a Single Carrier Frequency Division Multiple Access (SC-FDMA) scheme. The channel raster is 100 kHz.

Regarding radio measurements performed by the MTC apparatus, such measurements are typically performed on the serving as well as on neighbouring cells over some known reference symbols or pilot sequences. Such measurements are done on cells on an intra-frequency carrier and on inter-frequency carrier(s), as well as on inter-RAT carriers(s) (depending upon the capability of the MTC apparatus, e.g., whether it supports that RAT). To enable inter-frequency and inter-RAT measurements for the MTC apparatus requiring measurement gaps, the network has to configure the measurement gaps.

The radio measurements are done for various purposes. For example, the radio measurements may be done for purposes that include, but are not limited to, mobility, positioning, self-organizing network (SON), minimization of drive tests (MDT), operation and maintenance (O&M), network planning and optimization, etc. Examples of measurements in LTE include, but are not limited to, Cell identification (also known as Physical Cell ID (PCI) acquisition), Reference Symbol Received Power (RSRP), Reference Symbol Received Quality (RSRQ), acquisition of System Information (SI), Cell Global ID (CGI) acquisition, Reference Signal Time Difference (RSTD), UE receiver (RX)-transmitter (TX) time difference measurement, Radio Link Monitoring (RLM), which includes Out of Synchronization (out of sync) detection and In Synchronization (in-sync) detection, etc. Channel Status Information (CSI) measurements performed by the MTC apparatus are used for scheduling, link adaptation, etc., by the network node. Exemplary CSI measurements or CSI reports include, but are not limited to, Channel Quality Indication (CQI), Pre-coding Matrix Indicator (PMI), Rank Indicator (RI), etc. They may be performed on reference signals, e.g., CRS, CSI Reference Signal (CSI-RS), Demodulation Reference Signal (DM-RS), etc. The radio measurements may be unidirectional (e.g., DL or UL) or bidirectional (e.g., having both UL and DL components for obtaining the corresponding measurement, e.g., Rx-Tx, Round Trip Time (RTT), etc.).

The DL subframes #0 and #5 carry synchronization signals (e.g., both PSS and SSS). In order to identify an unknown cell (e.g., a new neighbor cell), the wireless apparatus, or MTC apparatus in the following discussion, acquires the timing of the new cell, and eventually obtains the PCI (in total there are 504 PCTs). Such operations are referred to as the cell search or cell identification, cell selection, or even the cell detection. Subsequently, the MTC apparatus also measures the Reference Signal Received Power (RSRP) and/or the Reference Signal Received Quality (RSRQ) of the newly identified cell in order to use such information itself and/or to report such information back to the network node. The cell search itself may be considered as a type of measurement. The measurements may e.g., be done in all Radio Resource Control (RRC) states, e.g., in RRC idle and connected states.

These radio measurements (e.g., RSRP, RSRQ, Reference Signal-Signal to Interference Ratio (RS-SINR), etc.) may be performed by the MTC apparatus in the RRC idle state for both cell selection and re-selection purposes. When camped on a cell, the MTC apparatus regularly searches for a better cell according to the cell reselection criteria. If a better cell is found, the MTC apparatus selects that cell. The change from one cell to another may imply a change to a new cell within the same RAT or to a cell of a different RAT. In other words, the MTC apparatus may perform intra-frequency, inter-frequency, or inter-RAT cell reselection. The cell reselection is performed by the MTC apparatus autonomously based on the network configured parameters, e.g., ARFCN of carriers, signal quality/strength offsets, cell reselection timer, etc. For example, in case of intra-frequency cell reselection in LTE, the MTC apparatus identifies new intra-frequency cells and performs RSRP and RSRQ measurements of identified intra-frequency cells without an explicit intra-frequency neighbor list containing physical layer cell identities. The MTC apparatus is able to evaluate whether a newly detectable intra-frequency cell meets the reselection criteria within a pre-defined time period. This time is defined as a function of Discontinuous Reception (DRX) cycle used in idle state. Even though chipsets or circuits for wireless apparatus may support either one of the 1.4 MHz LTE-Cat-M1 (eMTC) standard and the LTE Cat-M2 (NB-IoT) standard, it is likely dual-mode chipsets will be provided for economic reasons. Thus, it is conceivable that an MTC apparatus will be compatible with multiple RATs, e.g., supporting both NB-IoT and eMTC.

The two different MTC RATs (e.g., eMTC and NB-IoT) in LTE may have different advantages and drawbacks. For example, NB-IoT may have larger coverage, but lower UL data rates, than eMTC. Thus, for a dual mode MTC device, using NB-IoT to transmit a large amount of data may require a long transmission time. Furthermore, it is well known in the art that in order to minimize the energy for transmission of a data packet, the transmission should be short. Thus, eMTC is better for large packets. On the other hand, for smaller data packets, NB-IoT may be preferred because, in general, a smaller bandwidth implies lower power or energy consumption for the transceiver parts in the wireless apparatus.

The solution presented herein enables a wireless apparatus, e.g., an MTC apparatus, to select between N different RATs, e.g., NB-IoT and eMTC where N≥3, when the control of all of the RATs is coordinated by one network node, and when the system bandwidth of N−1 of the RATs, e.g., the NB-IoT and eMTC system bandwidths are within the system bandwidth of the remaining RAT, e.g., LTE. It will be appreciated that as used herein, the system bandwidth includes the central band (e.g., "in-band") as well as the guard bands. The MTC apparatus selects the RAT that results in a lower energy consumption at the wireless apparatus 200 for the communications between the MTC apparatus and the network node.

Figure 2A:
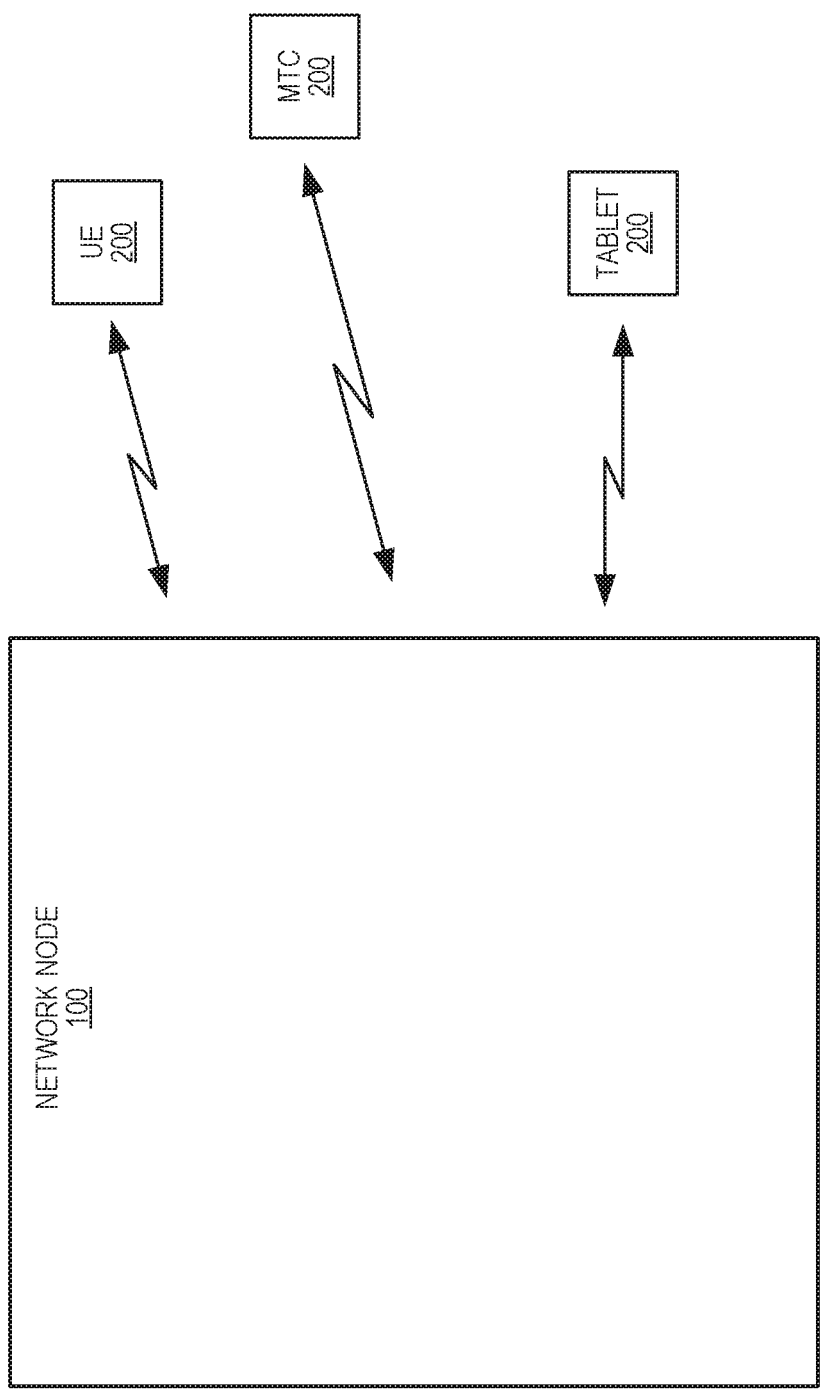

FIG. 2a shows a wireless communication network comprising a network node 100 in communication with multiple wireless apparatus 200, e.g., an MTC apparatus, a UE, and a tablet, where at least one of the wireless apparatus 200 supports communication with the network node 100 using one of multiple RATs. For simplicity, the following describes the solution presented herein in terms of a first RAT ($RAT_1$), e.g., eMTC, a second RAT ($RAT_2$), e.g., NB-IoT, a third RAT ($RAT_3$), e.g., LTE with a system bandwidth of 10, 15, or 20 MHz, and a wireless apparatus 200 comprising an MTC apparatus 200. It will be appreciated, however, that the solution presented herein may be used for selecting one RAT for communications between the MTC apparatus and the network node from any number of RATs, and that the wireless apparatus 200 is not limited to the discussed MTC apparatus.

Figure 2B:
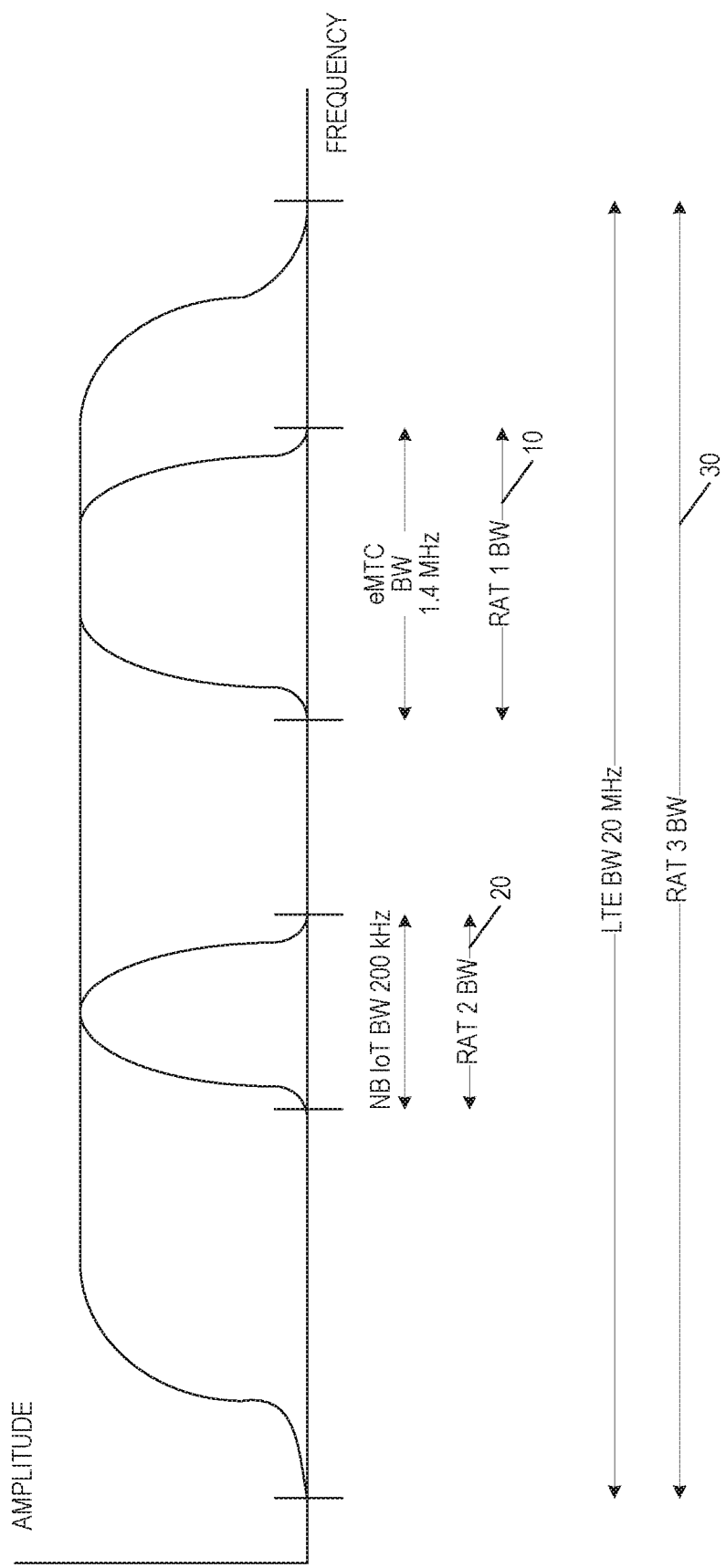
FIG. 2B shows the system bandwidths controlled by the network node according to one exemplary embodiment.

As shown in FIG. 2a, the network node 100 coordinates the communications involving $RAT_1$ and $RAT_2$. As also shown in FIG. 2b, the system bandwidth 20 of $RAT_2$ and the system bandwidth 10 of $RAT_1$ are both comprised within the system bandwidth 30 of $RAT_3$. It will be appreciated that as used herein, a system bandwidth includes the central band (e.g., "in-band") as well as the guard bands. Other terms that may be used interchangeably with system bandwidth include, but are not limited to, operating bandwidth, channel bandwidth, transmission bandwidth, cell bandwidth, cell transmission bandwidth, carrier bandwidth, etc. The bandwidth may be expressed in many different ways. For example, the bandwidth may be expressed in frequency units, e.g., kHz, MHz, etc., or as a number of resource blocks, a number of resource elements, a number of subcarriers, a number of physical channels, a number of frequency resource units, etc. It will further be appreciated that the frequency channel or carrier frequency over which a RAT operates is enumerated or addressed by a channel number, which may also be referred to as the absolute radio frequency channel number (ARFCN), e.g., Evolved Universal Terrestrial Radio Access (E-UTRA) ARFCN (EARFCN) in LTE. Exemplary system bandwidths for the LTE RAT, e.g., $RAT_3$, are 1.4 MHz, 3 MHz, 5 MHz, 10 MHz, 15 MHz, 20 MHz, etc. Exemplary bandwidths for the NB-IoT RAT, e.g., $RAT_2$, are 200 kHz, 1 resource block 12 or 48 subcarriers, etc. An exemplary bandwidth for the eMTC RAT, e.g., $RAT_1$, is 1.4 MHz or 6 RBs. It will be appreciated that the network node 100 may operate $RAT_2$ (e.g., NB-IoT) using a plurality of channels, e.g., two or more 200 kHz channels. Because the $RAT_2$ system bandwidth 20 is comprised within the $RAT_3$ system bandwidth 30, the $RAT_2$ system bandwidth 20 may be comprised within the in-band and/or guard band portion of the $RAT_3$ system bandwidth 30. For example, assume $RAT_3$ has a 10 MHz system bandwidth 30. In this case, the guard band of the $RAT_3$ system bandwidth 30 is 1 MHz in total, i.e., 0.5 MHz on each side of the carrier. For this example, the $RAT_2$ system bandwidth 20 may be comprised within any one or more resource blocks of the central 9 MHz (i.e., 45 RBs), any one or more resource blocks of the 1 MHz guard band (i.e., 5 RBs), or some combination thereof. Similar logic may apply for the $RAT_1$ system bandwidth 10.

FIG. 3 shows a method 300 implemented by the MTC apparatus 200 according to one exemplary solution. The MTC apparatus 200 identifies a first RAT and a second RAT that are both coordinated by the network node 100, where a $RAT_2$ system bandwidth 20 and a $RAT_1$ system bandwidth 10 are both comprised within a $RAT_3$ system bandwidth 30 (block 310). The MTC apparatus 200 selects the RAT that results in a lower energy consumption at the wireless apparatus 200 for communications between the MTC apparatus 200 and the network node 100 (block 320). The MTC apparatus 200 then uses the selected RAT (e.g., $RAT_1$ or $RAT_2$) for communications with the network node 100 (block 330).

Figure 4:
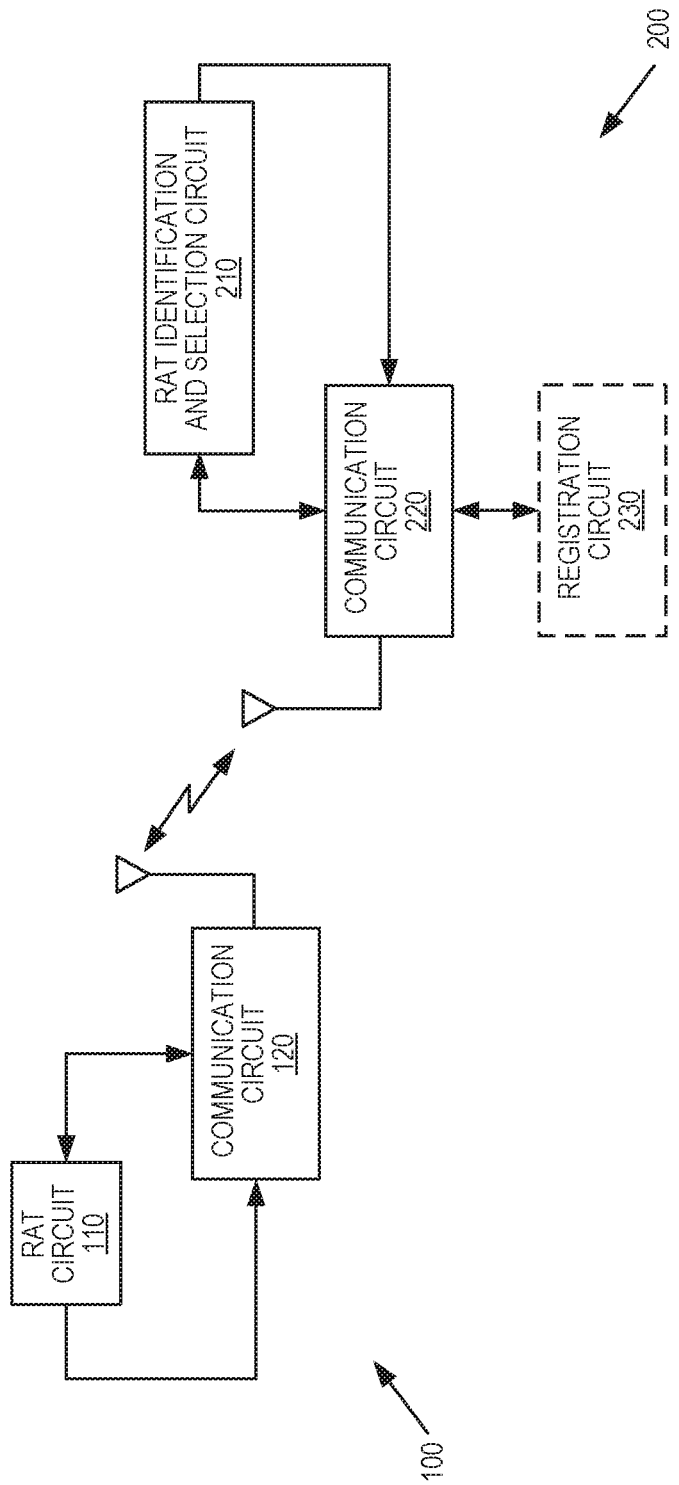
FIG. 4 shows a block diagram for the network node and wireless apparatus of FIG. 3 according to one exemplary embodiment.

FIG. 4 shows an exemplary MTC apparatus 200 for implementing the method 300 of FIG. 3. As shown in FIG. 4, the MTC apparatus 200 comprises a RAT identification and selection circuit 210 and a communication circuit 220. The RAT identification and selection circuit 210 identifies a first RAT and a second RAT that are both coordinated by the network node 100, where a second system bandwidth 20 of $RAT_2$ and a first system bandwidth 10 of $RAT_1$ are both comprised within a $RAT_3$ system bandwidth 30. The RAT identification and selection circuit 210 also selects the RAT that results in a lower energy consumption at the wireless apparatus 200 for communications between the MTC apparatus 200 and the network node 100. The communication circuit 220 uses the selected RAT (e.g., $RAT_1$ or $RAT_2$) for communications with the network node 100. It will be appreciated that the communication circuit 220 may be turned off or kept in a low-power mode to save power until it is time to execute some communication task (using the selected RAT).

The RAT identification and selection circuit 210 may inherently or explicitly identify/determine the first and second RATs, which are both coordinated by the same network node 100, where the $RAT_2$ system bandwidth 20 and the $RAT_1$ system bandwidth 10 are both comprised within a RAT$_3$ system bandwidth 30. In one embodiment, the RAT identification and selection circuit 210 may make this determination based on historical information previously received or acquired by the wireless apparatus 200 that is stored in memory of the apparatus 200 (not shown). For example, the RAT identification and selection circuit 210 may determine, from stored information, that this particular network node 100 previously coordinated RAT$_1$ and RAT$_2$, and thus makes the assumption that this network node 100 is still able to do so. In another embodiment, the RAT identification and selection circuit 210 may make this determination using information carried over signaling received in the serving cell when served by RAT$_1$ or RAT$_2$, e.g., system information or dedicated signaling. In another embodiment, the RAT identification and selection circuit 210 may make this determination using information acquired over the user plane from a server that may be under operator control or under the control of a third party (e.g., "over-the-top," application based, etc.). In another embodiment, the RAT identification and selection circuit 210 may make this determination using information provided by other wireless apparatus 200, e.g., over a D2D link or via a server, and received by the communication circuit 220. This embodiment takes advantage of the fact that it may be easier for one or more wireless apparatus 200 in better coverage areas to determine the existence of another RAT$_1$ e.g., the RAT$_2$, where the wireless apparatus 200 in the better coverage areas then share this information with other apparatus 200 in the network. In another embodiment, the RAT identification and selection circuit 210 makes this determination using a cell search, e.g., an NB-IoT cell search on allowed NB-IoT anchor cell carriers. In this embodiment, the RAT identification and selection circuit 210 may search those possible anchor cell carriers for NB-IoT cells because a rule in the standard restricts the anchor cells to certain carriers, e.g., the 100 kHz ARFCN raster. In yet another embodiment, the wireless apparatus 200 may receive an explicit indication from the network node 100. For example, the communication circuit 220 may receive coordination information from the network node 100 indicating that the network node 100 is coordinating the operation of the first and second RATs, where the RAT identification and selection circuit 210 identifies the RATs from the received coordination information.

Under the assumption that the RAT identification and selection circuit 210 has identified at least two RATs that are both coordinated by the same network node 100, where the RAT$_2$ system bandwidth 20 and the RAT$_1$ system bandwidth 10 are both comprised within a RAT$_3$ system bandwidth 30, the RAT identification and selection circuit 210 selects the RAT that results in a lower energy consumption at the wireless apparatus 200 for communications between the MTC apparatus 200 and the network node 100. For example, the RAT identification and selection circuit 210 may make the selection responsive to an amount of data that needs to be communicated between the MTC apparatus 200 and the network node. In this exemplary embodiment, the RAT identification and selection circuit 210 may select the RAT with the narrower system bandwidth, e.g., RAT$_2$ if the amount of data to be communicated is less than some data threshold, and otherwise select the RAT with the wider system bandwidth, e.g., RAT$_1$. This data-based RAT selection takes advantage of the reduced power savings associated with a smaller bandwidth, e.g., NB-IoT, whenever the amount of data to be communicated is sufficiently small, while recognizing that a larger bandwidth RAT, e.g., eMTC, can communicate larger amounts of data in shorter periods of time, and thus require less power and energy than a narrower bandwidth RAT.

While the RAT identification and selection circuit 210 may use the amount of data to be communicated to make the RAT selection, the RAT identification and selection circuit 210 may alternatively or additionally use other metrics to make the selection. In one embodiment, the RAT identification and selection circuit 210 may determine a radio channel characteristic for a radio channel between the MTC apparatus 200 and the network node 100, e.g., a path loss, and then select the RAT that requires the least amount of power to communicate data given the determined radio channel characteristic. For example, the RAT identification and selection circuit 210 may compare the determined radio channel characteristic (e.g., the path loss) to a channel threshold. The RAT identification and selection circuit 210 then selects one of the RATs responsive to that comparison. For example, if a measured path loss is less than the channel threshold, the RAT identification and selection circuit 210 may select the RAT with the narrower system bandwidth, e.g., RAT$_2$. Exemplary radio channel characteristics include, but are not limited to the path loss, an uplink channel quality, a downlink channel quality, a RAT$_1$ coverage enhancement level, and a RAT$_2$ coverage enhancement level. For example, the RAT identification and selection circuit 210 may select the RAT with the narrower system bandwidth, e.g., RAT$_2$, when any or all of an estimated uplink quality, an estimated downlink quality, and a coverage enhancement level are less than their corresponding channel thresholds.

As noted above, the RAT identification and selection circuit 210 may use any number of thresholds to make the RAT selection. In one embodiment, the network node 100 provides these thresholds to the wireless apparatus, e.g., during initial setup, registration, periodically, etc. The provided thresholds may be stored in memory (not shown) for future use.

To reduce the energy consumption, an apparatus or device should in typical scenarios transmit as short time as possible, and using a wide bandwidth with short transmission time is typically better than using a small bandwidth with long transmission time. Hence, in an example embodiment, the selection of which RAT to use may be: Given the amount of data to be transmitted, if that fits within a sub frame (1 ms) of NB-IoT (200 kHz bandwidth, 1 RB wide) the device determines to use the NB-IoT RAT, otherwise if data amount fits within one sub frame (1 ms) of eMTC (1.4 MHz, 6 RB) the device chooses the eMTC RAT. In case the data needs to span several sub frames also for eMTC, then the eMTC RAT could be selected, due to the arguments above. In some embodiments the amount of data that can be transmitted in a subframe depends on coding and modulation used, which in turn depends on the radio channel characteristics. Hence the apparatus or device needs to monitor the radio channel characteristics (e.g., by measurements on DL and using that, as UL and DL is approximately of similar quality). Based on the estimated radio channel quality an indication of MCS to be used for reliable transmission can be determined and by that also the amount of data that can be transmitted in a sub frame.

The RAT identification and selection circuit 210 may also or additionally rely on thresholds stored in the device when the device is initially configured. Further, because both RATs are coordinated by the same network node and because the system bandwidth for RAT$_1$ and RAT$_2$ is comprised within the system bandwidth for another RAT, e.g., RAT$_3$, the RAT identification and selection circuit 210 may reuse one or more measurements associated with one RAT to obtain/determine measurements for the other RAT used as part of the selection process. For example, the wireless apparatus 200 may use a path loss measurement associated with $RAT_1$ to evaluate both RATs, e.g., to determine a transmission power necessary for $RAT_1$ and for $RAT_2$ given a path loss measured for $RAT_1$. Thus, the constraints placed on the RATs available for the selection potentially reduces the energy consumed by the wireless apparatus 200 when making the selection.

In some embodiments, the MTC apparatus 200 may not be registered with the selected RAT, or the MTC apparatus may not be camped on the selected RAT. To address this, the MTC apparatus 200 may also include an optional registration circuit 230 that deregisters the MTC apparatus 200 from its current RAT (if necessary) and registers the MTC apparatus 200 with the selected RAT. Registration circuit 230 may perform a RAT re-selection, e.g., perform a random access for the selected RAT according to any known techniques, before the communication circuit 220 communicates the data using the selected RAT. In another embodiment, e.g., when the MTC apparatus 200 is not registered with the selected RAT, the registration circuit 230 may execute a registration procedure for the selected RAT according to any known techniques before the communication circuit 220 communicates data using the selected RAT.

Figure 5:
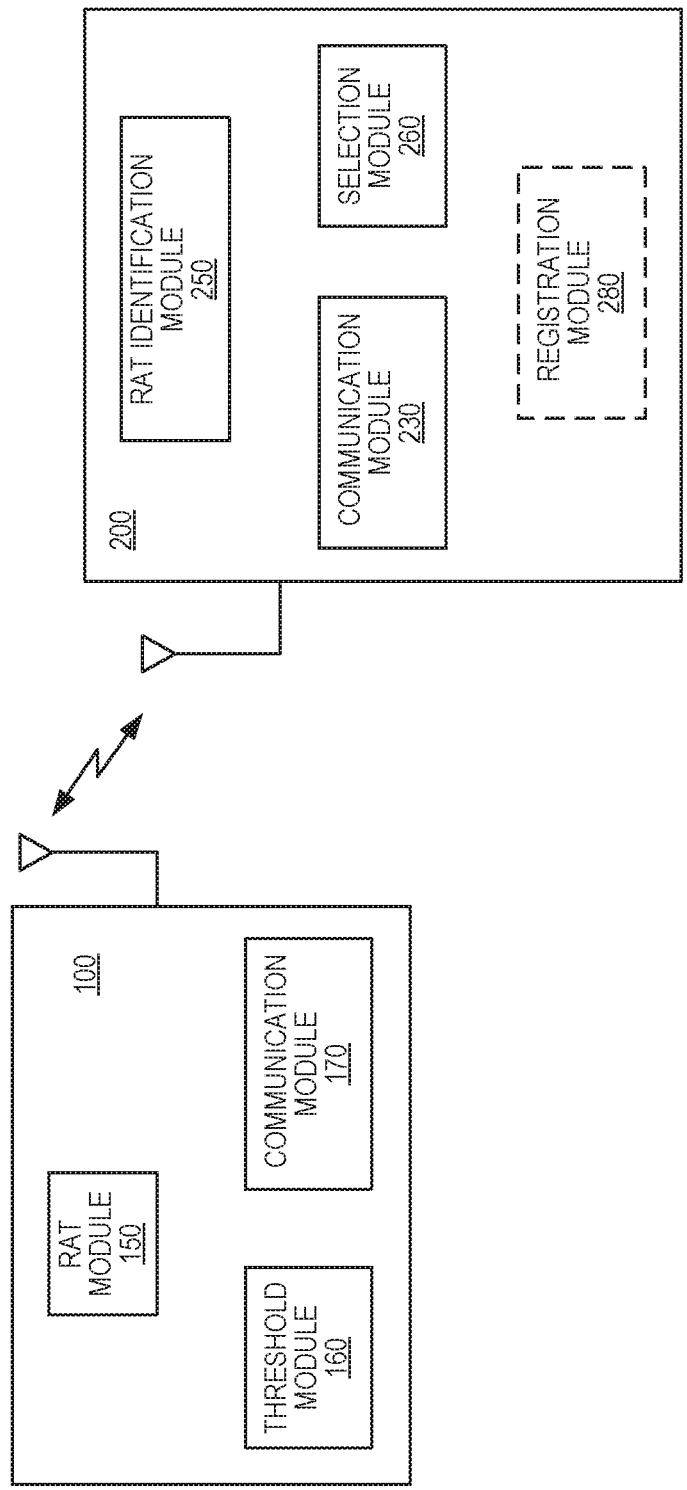
FIG. 5 shows a block diagram for the network node and wireless apparatus of FIG. 2 according to another exemplary embodiment.

It will be appreciated that other devices may implement the method 300 of FIG. 3. For example, the wireless apparatus 200 shown in FIG. 5 may use a RAT identification module 250, selection module 260, communication module 270, and optional registration module 280 to implement method 300, and any of the above described tasks and/or functions associated with the RAT identification and selection circuit 210, communication circuit 220, and optional registration circuit 230, respectively. Those of skill in the art will also readily recognize that the method 300 described herein may be implemented as stored computer program instructions for execution by one or more computing devices, such as microprocessors, Digital Signal Processors (DSPs), FPGAs, ASICs, or other data processing circuits. The stored program instructions may be stored on machine-readable media, such as electrical, magnetic, or optical memory devices. The memory devices may include ROM and/or RAM modules, flash memory, hard disk drives, magnetic disc drives, optical disc drives and other storage media known in the art. For example, method 300 may be implemented using a processing circuit (in the wireless apparatus 200) comprising software instructions that when run on the processing circuit cause the processing circuit to execute the method 300 of FIG. 3.

FIG. 6 shows an exemplary method 400 executed by the network node 100 to facilitate the RAT selection implemented by the MTC apparatus 200. As shown in FIG. 6, the network node 100 determines that the MTC apparatus 200 supports communications with the network node 100 using at least $RAT_1$ and $RAT_2$, where the $RAT_2$ system bandwidth and the $RAT_1$ system bandwidth are both comprised within a $RAT_3$ system bandwidth 30 (block 410). The network node 100 coordinates all of $RAT_1$, $RAT_2$, and $RAT_3$. The network node 100 determines at least one power threshold associated with an amount of transmit power required for communications between the wireless MTC apparatus 200 and the network node 100, where the determined power threshold(s) control the RAT selection made by the MTC apparatus 200 (block 420). The network node 100 transmits the power threshold(s) to the MTC apparatus 200 (block 430). For example, the network node 100 may use Radio Resource Control (RRC) signaling to transmit the power threshold(s), e.g., during initial registration, at handover, at tracking area update, via paging, etc.

FIG. 4 shows an exemplary block diagram for a network node 100 configured to execute the method 400 of FIG. 6. The network node 100 comprises a RAT circuit 110 and a communication circuit 120. The RAT circuit 110 determines that the MTC apparatus 200 supports communications with the network node 100 using a first RAT and a second RAT that are both coordinated by the network node 100, wherein a second system bandwidth 20 of the second RAT and a first system bandwidth 10 of the first RAT are both comprised within a third system bandwidth 30 of a third RAT coordinated by the network node 100. The RAT circuit 110 also determines at least one power threshold associated with an amount of transmit power required for communications between the MTC apparatus 200 and the network node 100, wherein the at least one power threshold controls the selection of the first RAT or the second RAT for the communications between the MTC apparatus 200 and the network node 100. The communication circuit 120 transmits the at least one power threshold to the MTC apparatus 200.

As noted above, the RAT circuit 110 determines power threshold(s) associated with an amount of transmit power required by the MTC apparatus 200 for communications between the MTC apparatus 200 and the network node 100. The RAT circuit 110 may determine such threshold(s), e.g., from signal levels configured by the operator upon deployment of the network. In one embodiment, the threshold circuit 120 may determine a power threshold comprising a data threshold that corresponds to an amount of data to be communicated with a certain transmit power required for such communications. In another embodiment, the RAT circuit 110 may determine a power threshold comprising a channel threshold that corresponds to the communications between the MTC apparatus 200 and the network node 100 for given channel conditions with a certain transmit power required for such communications. It will be appreciated that the RAT circuit 110 may determine multiple thresholds, any or all of which may be used by the MTC apparatus for RAT selection. It will also be appreciated that the RAT circuit 110 may use any available information to determine the power threshold(s), e.g., information from initial cell deployment, historical data from previous communications, MDT-type measurements, etc. Further, the power threshold determination may be assisted by dual-mode MTC devices or SON-type measurements (e.g., Automatic Neighbor Relation (ANR)). Further, while some thresholds may comprise fixed thresholds determined in advance, in some embodiments the threshold circuit 120 may dynamically determine one or more power thresholds as channel conditions, system configurations, etc., change.

The RAT circuit 110 may determine that the MTC apparatus 200 supports communications using multiple RATs explicitly or implicitly. For example, the RAT circuit 110 may make the determination using signaling information received from the MTC apparatus 200, or based on information stored in memory (not shown) regarding the specific MTC apparatus 200.

It will be appreciated that other devices may implement the method 400 of FIG. 6. For example, the network node 100 shown in FIG. 5 may include a RAT module 150, threshold module 160, and communication module 170 to implement method 400, and any of the above described tasks and/or functions associated with the RAT circuit 110 and communication circuit 120, respectively. Those of skill in the art will also readily recognize that the method 400 described herein may be implemented as stored computer program instructions for execution by one or more computing devices, such as microprocessors, Digital Signal Processors (DSPs), FPGAs, ASICs, or other data processing circuits. The stored program instructions may be stored on machine-readable media, such as electrical, magnetic, or optical memory devices. The memory devices may include ROM and/or RAM modules, flash memory, hard disk drives, magnetic disc drives, optical disc drives and other storage media known in the art. For example, method 400 may be implemented using a processing circuit (in the network node) comprising software instructions that when run on the processing circuit cause the processing circuit to execute the method 400 of FIG. 6.

Figure 7:
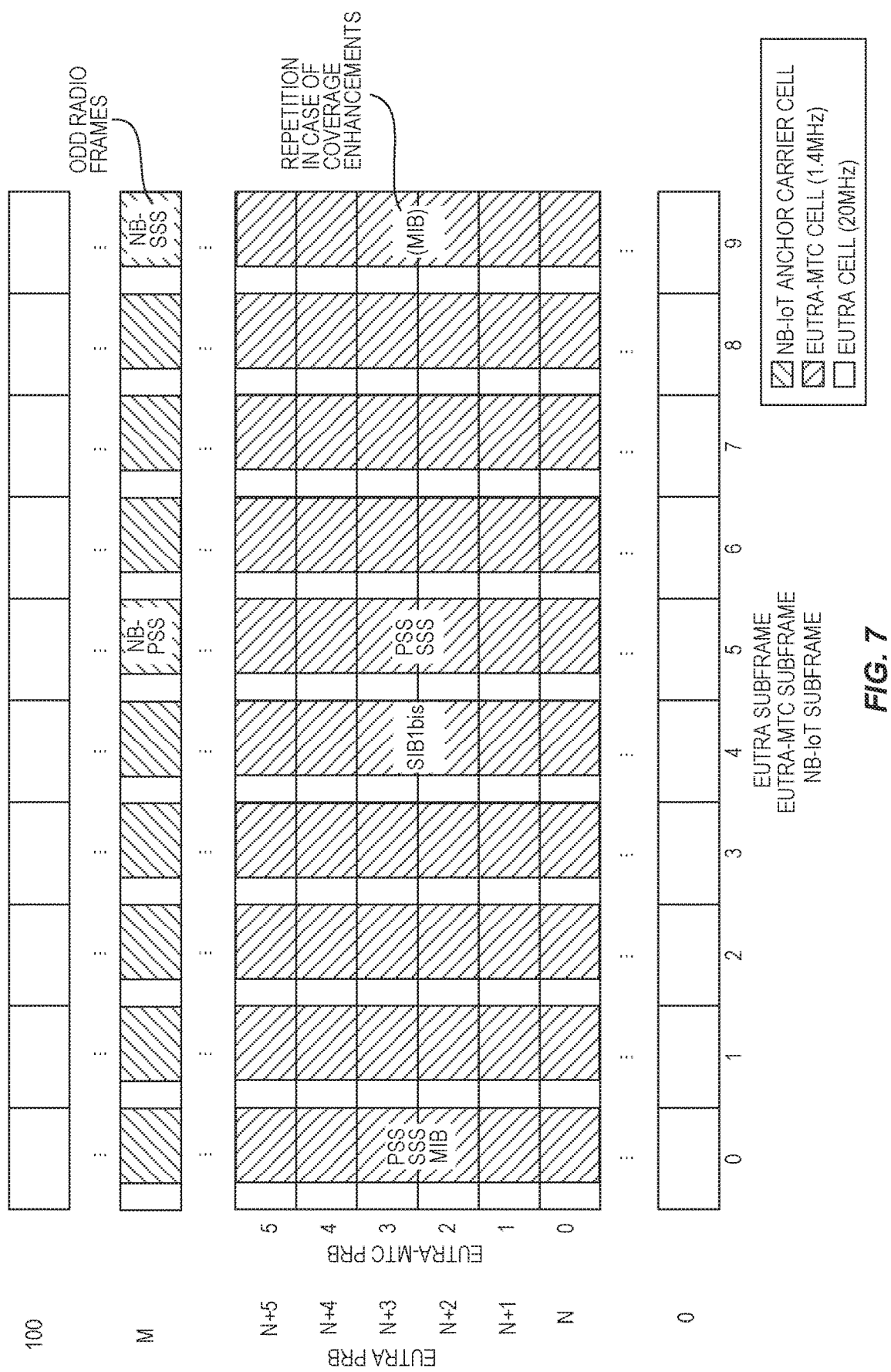
FIG. 7 shows one exemplary deployment scenario.

FIG. 7 shows one exemplary deployment scenario (with time in the x-axis and frequency in the y-axis), where the eMTC system bandwidth (PRBs: N to N+5) is at the center of an LTE system bandwidth (PRBs: 0 to 100), and an NB-IoT system bandwidth (PRB: M) is outside the eMTC system bandwidth but within the LTE system bandwidth. Because synchronization to eMTC is based on detecting the same synchronization signals as for the regular LTE cell, the eMTC cell is confined to the center six PRBs or RBs of the regular LTE cell. The regular LTE cell may also support one or more in-band NB-IoT cells. Neither the eMTC nor the NB-IoT cells transmit anything in the first three OFDM symbols of a subframe, because this would collide with the control signaling in the regular LTE cell.

The solution presented herein improves the system as well as device performance by allowing multi-mode wireless apparatus to use the best RAT for the communication of data with the network node in order to minimize or decrease the power or energy consumption in the wireless apparatus, which enables long life service without battery exchange or battery charging. Further, when the two RATs, e.g., eMTC and NB-IoT, are coordinated and transmitted from the same network node, one can use measurements on path loss on one RAT for determination of path loss for the other RAT. Hence, the wireless apparatus does not need to do more measurements to implement the RAT selection, which saves power. Further, the solution presented herein allows the wireless apparatus to exploit the best features of each RAT to reduce the power or energy consumption of the wireless apparatus for given circumstances, e.g., amount of data, channel conditions, etc.

The solution presented herein may, of course, be carried out in other ways than those specifically set forth herein without departing from essential characteristics of the solution. The present embodiments are to be considered in all respects as illustrative and not restrictive, and all changes coming within the meaning and equivalency range of the appended claims are intended to be embraced therein.

What is claimed is:

1. A method of selecting a Radio Access Technology (RAT) as implemented by a network node configured to communicate with a multi-mode wireless apparatus using the selected RAT, the method comprising:
    determining that the wireless apparatus supports communications with the network node using a first RAT and a second RAT that are both coordinated by the network node, wherein a second system bandwidth of the second RAT and a first system bandwidth of the first RAT are both comprised within a third system bandwidth of a third RAT coordinated by the network node;
    determining a data threshold that corresponds to an amount of data to be communicated with a transmit power of the wireless apparatus required for such communications, wherein the data threshold controls the selection of the first RAT or the second RAT for the communications between the wireless apparatus and the network node; and
    transmitting the data threshold to the wireless apparatus.

2. The method of claim 1 wherein the first RAT comprises an evolved Machine Type Communication (eMTC) RAT, wherein the second RAT comprises a Narrow Band Internet of Things (NB-IoT) RAT, and wherein the third RAT comprises a Long Term Evolution (LTE) RAT.

3. The method of claim 1 wherein the wireless apparatus comprises a Machine-Type Communication (MTC) apparatus.

4. A network node configured to communicate with a multi-mode wireless apparatus using a Radio Access Technology (RAT) selected by the wireless apparatus, the network node comprising:
    a RAT circuit configured to:
        determine that the wireless apparatus supports communications with the network node using a first RAT and a second RAT that are both coordinated by the network node, wherein a second system bandwidth of the second RAT and a first system bandwidth of the first RAT are both comprised within a third system bandwidth of a third RAT coordinated by the network node;
        determine a data threshold that corresponds to an amount of data to be communicated with a transmit power of the wireless apparatus required for such communications, wherein the data threshold controls the selection of the first RAT or the second RAT for the communications between the wireless apparatus and the network node; and
    a communication circuit configured to transmit the data threshold to the wireless apparatus.

5. The network node of claim 4, wherein the first RAT comprises an evolved Machine Type Communication (eMTC) RAT, wherein the second RAT comprises a Narrow Band Internet of Things (NB-IoT) RAT, and wherein the third RAT comprises a Long Term Evolution (LTE) RAT.

6. The network node of claim 4, wherein the wireless apparatus comprises a Machine-Type Communication (MTC) apparatus.

7. A computer program product stored in a non-transitory computer readable medium for controlling a processing circuit in a network node in communication with a multi-mode wireless apparatus, the computer program product comprising software instructions which, when run on the processing circuit, causes the processing circuit to:
    determine that the wireless apparatus supports communications with the network node using a first RAT and a second RAT that are both coordinated by the network node, wherein a second system bandwidth of the second RAT and a first system bandwidth of the first RAT are both comprised within a third system bandwidth of a third RAT coordinated by the network node;
    determine a data threshold that corresponds to an amount of data to be communicated with a transmit power of the wireless apparatus required for such communications, wherein the data threshold controls the selection of the first RAT or the second RAT for the communications between the wireless apparatus and the network node; and
    transmit the data threshold to the wireless apparatus.

* * * * *

UNITED STATES PATENT AND TRADEMARK OFFICE
CERTIFICATE OF CORRECTION

Page 1 of 2

PATENT NO. : 10,785,712 B2
APPLICATION NO. : 16/749323
DATED : September 22, 2020
INVENTOR(S) : Lindoff et al.

It is certified that error appears in the above-identified patent and that said Letters Patent is hereby corrected as shown below:

In the Specification

In Column 1, Line 7, delete "2016," and insert -- 2016, now Pat. No. 10,588,072, --, therefor.

In Column 1, Line 30, delete "and many" and insert -- and may --, therefor.

In Column 5, Line 25, delete "(but" and insert -- but --, therefor.

In Column 5, Lines 61-62, delete "Physical Downlink Shared Control Channel (PDSCH)" and insert -- Physical Downlink Shared Channel (PDSCH) --, therefor.

In Column 6, Line 20, delete "GSM Evolution) Radio Access Network)" and insert -- GSM Evolution) RAN (Radio Access Network)) --, therefor.

In Column 6, Lines 61-62, delete "downlink physical control channels" and insert -- physical downlink control channels --, therefor.

In Column 6, Line 63, delete "downlink physical shared channels" and insert -- physical downlink shared channels --, therefor.

In Column 6, Line 64, delete "PDSCH (Physical Downlink Shared Control Channel))." and insert -- PDSCH (Physical Downlink Shared Channel)). --, therefor.

In Column 8, Line 22, delete "Channel Status Information (CSI)" and insert -- Channel State Information (CSI) --, therefor.

In Column 8, Line 39, delete "PCTs)." and insert -- PCIs). --, therefor.

In Column 11, Line 27, delete "RAT1 e.g.," and insert -- RAT, e.g., --, therefor.

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*

In Column 14, Lines 29-30, delete "threshold circuit 120" and insert -- RAT circuit 110 --, therefor.

In Column 14, Line 50, delete "threshold circuit 120" and insert -- RAT circuit 110 --, therefor.